US011102678B2

(12) United States Patent
Liu et al.

(10) Patent No.: US 11,102,678 B2
(45) Date of Patent: Aug. 24, 2021

(54) RADIO RESOURCE CONTROL (RRC) MESSAGE SEGMENTATION

(71) Applicant: MEDIATEK INC., Hsin-Chu (TW)

(72) Inventors: Yung-Hsiang Liu, Hsin-Chu (TW); Chia-Chun Hsu, Hsin-Chu (TW); Nathan Edward Tenny, San Jose, CA (US)

(73) Assignee: MediaTek INC., Hsin-Chu (TW)

( * ) Notice: Subject to any disclaimer, the term of this patent is extended or adjusted under 35 U.S.C. 154(b) by 84 days.

(21) Appl. No.: 16/584,948

(22) Filed: Sep. 27, 2019

(65) Prior Publication Data

US 2020/0107223 A1    Apr. 2, 2020

Related U.S. Application Data

(60) Provisional application No. 62/737,984, filed on Sep. 28, 2018, provisional application No. 62/741,649, filed on Oct. 5, 2018.

(51) Int. Cl.
H04W 28/06 (2009.01)
H04W 80/02 (2009.01)
H04L 29/06 (2006.01)

(52) U.S. Cl.
CPC .......... *H04W 28/065* (2013.01); *H04W 80/02* (2013.01)

(58) Field of Classification Search
CPC ... H04W 28/065; H04W 28/06; H04W 80/02; H04W 72/0413; H04W 24/08;

(Continued)

(56) References Cited

U.S. PATENT DOCUMENTS 7,181,218 B2 * 2/2007 Ovesjo ............. H04W 36/0066
                                                    370/321
10,257,747 B2 * 4/2019 Kim ...................... H04W 80/02
(Continued)

FOREIGN PATENT DOCUMENTS

CN          102421136 A      9/2010
WO      WO2018039974 A1     8/2016

OTHER PUBLICATIONS

International Search Report and Written Opinion of International Search Authority for PCT/CN2019/109020 dated Dec. 30, 2019 (9 pages).

(Continued)

*Primary Examiner* — Sai Aung
(74) *Attorney, Agent, or Firm* — Imperium Patent Works; Helen Mao; Zheng Jin

(57) ABSTRACT

Methods and apparatus are provided for the RRC message segmentation. In one novel aspect, the UE obtains the size Z of the RRC message and the size limit L of the underlying transmission at layer S of the UE protocol stack, wherein the layer S either the RRC layer, the PDCP layer, or a sublayer between an RRC layer and a PDCP layer. The UE triggers RRC message segmentation upon detecting Z is greater than L. In another embodiment, the layer R of the protocol stack of the UE receives, in order, a sequence of chunks of an RRC message, reassembles of the RRC message, wherein the layer R is selected from a same layer as the layer S and a layer higher than the layer S. In one novel aspect, the size limitation L is either predefined or obtained through network notification or UE inquiry.

14 Claims, 7 Drawing Sheets

(58) Field of Classification Search
CPC ............ H04W 28/18; H04W 72/0406; H04W 72/042; H04W 84/042; H04W 88/02; H04W 88/08
See application file for complete search history.

(56) References Cited

U.S. PATENT DOCUMENTS

| | | | | |
|---|---|---|---|---|
| 10,616,913 | B2* | 4/2020 | Kim | H04W 74/0833 |
| 10,721,650 | B2* | 7/2020 | Kim | H04W 72/14 |
| 10,728,943 | B2* | 7/2020 | Jang | H04W 52/0206 |
| 2003/0236085 | A1* | 12/2003 | Ho | H04W 12/037 |
| | | | | 455/411 |
| 2009/0238129 | A1* | 9/2009 | Park | H04W 76/22 |
| | | | | 370/329 |
| 2013/0044698 | A1* | 2/2013 | Susitaival | H04W 28/06 |
| | | | | 370/329 |
| 2017/0041767 | A1* | 2/2017 | Vajapeyam | H04W 4/06 |
| 2018/0097918 | A1* | 4/2018 | Nuggehalli | H04L 5/0091 |
| 2019/0037001 | A1* | 1/2019 | Fujishiro | H04L 65/10 |
| 2019/0074888 | A1* | 3/2019 | Wu | H04B 7/0408 |
| 2019/0200212 | A1 | 6/2019 | Quan et al. | |

OTHER PUBLICATIONS

R2-1807381 3GPP TSG-RAN WG2 NR meeting #102, Intel Corp., "UE Capability ID based UE capability transfer", Busan, South Korea, May 21-25, 2018 (5 pages) *section 4*.

R2-1803629 3GPP TSG-RAN WG2 Meeting #10, Qualcomm Incorporated, "Managing larger Capability containers", Athens, Greece, Feb. 26-Mar. 2, 2018 (4 pages) *sections 2, 3*.

R2-1814603 3GPP TSG-RAN2 Meeting #103bis, Huawei et al., "Segmentation of UE Radio Capability Information", Chengdu, China, Oct. 8-12, 2018 (2 pages) *section 2*.

* cited by examiner

RADIO RESOURCE CONTROL (RRC) MESSAGE SEGMENTATION

CROSS REFERENCE TO RELATED APPLICATIONS

This application claims priority under 35 U.S.C. § 119 from U.S. Provisional Application No. 62/737,984 filed on Sep. 28, 2018, titled "RRC message segmentation," and U.S. Provisional Application No. 62/741,649 filed on Oct. 5, 2018, titled "Indication of UL RRC Message Size Limitation," the subject matter of which is incorporated herein by reference.

TECHNICAL FIELD

The disclosed embodiments relate generally to wireless communication, in particular to radio resource control (RRC) message segmentation.

BACKGROUND

The new radio (NR) network technology will be a key component of the modern wireless network. It will address high traffic growth and increasing demand for high-bandwidth connectivity. It will also support massive numbers of connected devices and meet the real-time, high-reliability communication needs of mission-critical applications. Currently, packet data convergence protocol (PDCP) layer of the NR network only supports up to 9 Kbytes for radio resource control (RRC) message. Further, some other size limitation may exist between the base station and the core network. On the other hand, the size of UE capability becomes larger when much more functionalities are designed and added in the cellular network. The size of the NR user equipment (UE) capability report may become larger than the designed transmission size limitation. When an RRC message with larger than the size limit of the underlying transmission layers, the message sending and receiving will fail.

A solution is sought to resolve the increased RRC message to fit in the underlying size limits.

SUMMARY

Methods and apparatus are provided for the RRC message segmentation. In one novel aspect, the UE obtains the size Z of the RRC message and the size limit L of the underlying transmission at layer S of the UE protocol stack, wherein the layer S is selected from an RRC layer, a packet data convergence protocol (PDCP) layer, and a sublayer between an RRC layer and a PDCP layer. The UE determines if the size Z is greater than the size L. If yes, the UE triggers RRC message segmentation. In one embodiment, the layer S segments RRC message into a sequence of chunks such that each chunk has a size smaller than L. In one embodiment, each chunk of the RRC message includes a metadata for reassembly. In another embodiment, each chunk of the RRC message includes a metadata for reassembly. In yet another embodiment, the layer S sends each chunk of the RRC message in a sequence order to lower layers of the UE protocol stack. In one embodiment, a reserved bit in a PDCP message header is used to indicate a reassembly is needed when the RRC message is segmented at layer S.

In another embodiment, the layer R of the protocol stack of the UE receives, in order, a sequence of chunks of an RRC message at a layer R of the UE protocol stack, wherein the RRC message is segmented at a layer S of a UE protocol stack, wherein the layer S is either the RRC layer, the PDCP layer, or a sublayer between an RRC layer and a PDCP layer. The layer R of the UE reassembles of the RRC message by concatenating the received chunks of the RRC message at the layer R in sequence, determines if the concatenated RRC message is a complete RRC message by the UE and sends the concatenated RRC message to an upper layer of the protocol stack when the concatenated RRC message is determined to be complete. The layer R is selected from a same layer as the layer S and a layer higher than the layer S. In one embodiment, the UE determines the completeness of the RRC message based on at least one procedure selecting from checking corresponding metadata in each chunk of the RRC message, and checking concatenated octets at an RRC layer of the UE. In another embodiment, the reassembling is performed at a PDCP layer of the UE protocol stack on a PDCP packet data unit (PDU), and wherein the PDCP layer reassembles received data with a next PDCP PDU if a reserved bit of the PDCP PDU header equals 0, otherwise, the PDCP layer delivers reassembled data to an upper layer. In another embodiment, the reassembling is performed at an RRC layer of the UE protocol stack by storing and concatenating chunks of the RRC message in a pending queue, and wherein the RRC layer process discarding remainder contents of the pending queue if the concatenated chunks of RRC message is a complete RRC message. In one embodiment, the UE starts a reassembly timer upon detecting a corrupted RRC message and discards received chunks of the RRC message upon timer expired and no complete RRC message is reassembled. In another embodiment, the UE tracks a chunk number of segmented chunks received; compares the chunk number with a predefined upper limit chunk number; and discards received chunks of the RRC message in the pending queue when the chunk number is greater than the predefined upper limit chunk number.

In one novel aspect, the size limitation L is obtained with a procedure selecting from obtaining a network predefined value of L, receiving a network notification of the size limitation L, and receiving a reply to an inquiry of the size limitation by the UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
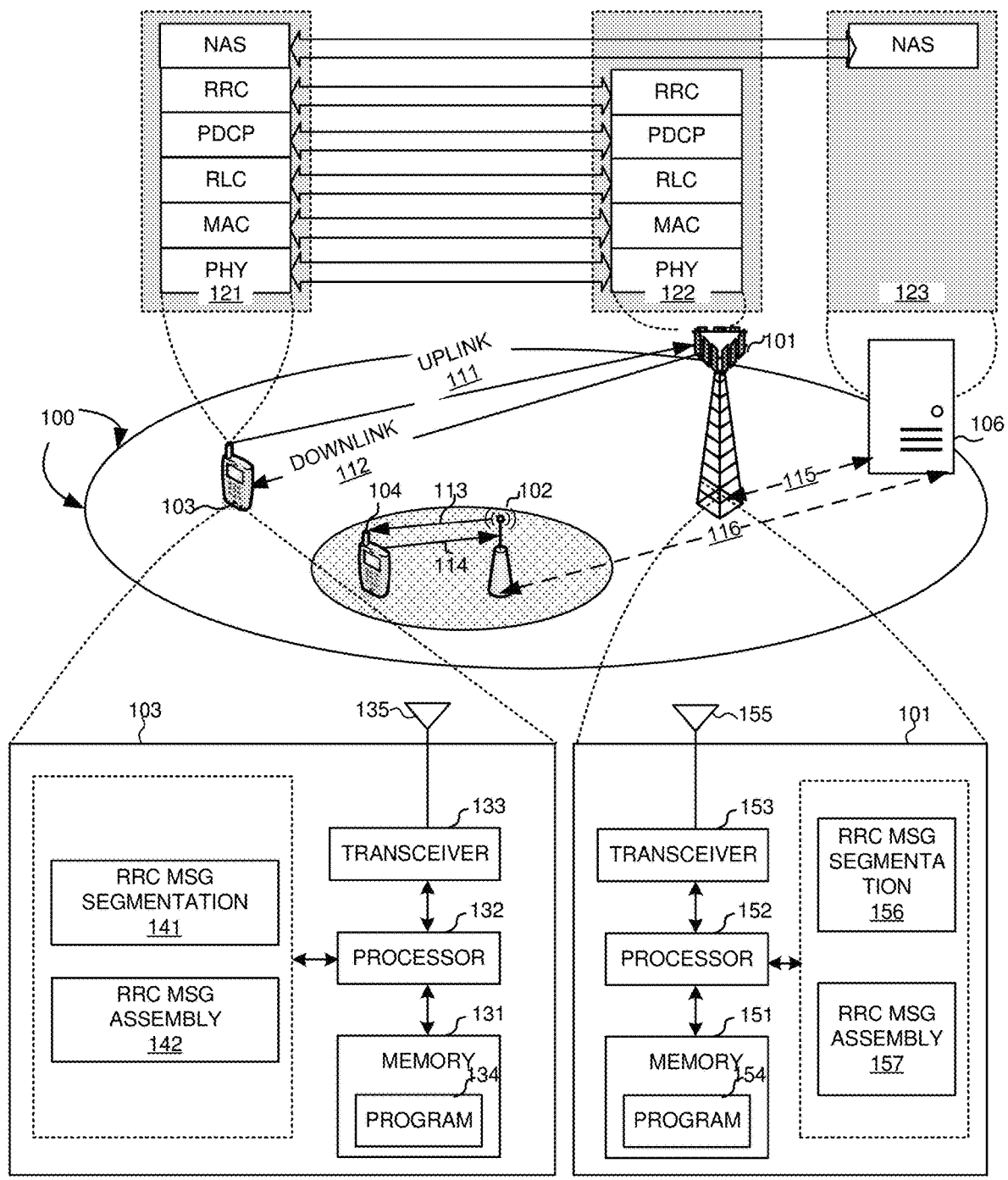
FIG. 1 illustrates an NR network with RRC segmentation and reassembly in accordance with embodiments of the current invention.

FIG. 1 illustrates an NR network 100 with RRC segmentation and reassembly in accordance with embodiments of the current invention. NR network 100 includes one or more fixed base infrastructure units forming a network distributed over a geographical region. The base unit may also be referred to as an access point, an access terminal, a base station, a Node-B, an eNode-B (eNB), or by other terminology used in the art. In FIG. 1, the one or more base stations 101 and 102 serve a number of UEs 103 and 104 within a serving area, for example, a cell or a cell sector.

Generally, serving base stations 101 and 102 transmit downlink communication signals 112 and 113 to UEs in the time and/or frequency domain. UEs 103 and 104 communicate with one or more base stations 101 and 102 via uplink communication signals 111 and 114. UE or the mobile station may also be referred to as a mobile phone, laptop, and mobile workstation and so on. Base stations, such as base station 101 and 102, connect to one or more network entities, such as an access and mobility management function (AMF) entity 106. Base stations 101 and 102 communicates with AMF 106 via links 161 and 162, respectively.

FIG. 1 also shows an exemplary diagram of protocol stacks for control-plane for UE 103 and eNB 101. UE 103 has a protocol stack 121, which includes the physical (PHY) layer, the medium access control (MAC) layer, the radio link control (RLC) layer, the pack data convergence protocol (PDCP) layer, and the radio resource control (RRC) layer. Similarly, eNB 101 has a protocol stack 122, which includes the PHY layer, the MAC layer, the RLC layer, the PDCP layer, and the RRC layer, each of which connects with their corresponding protocol stack of UE protocol stack 121. AMF 106, with a protocol stack 123, may have the NAS layer communicates with UE NAS layer.

FIG. 1 further illustrates simplified block diagrams 130 and 150 for UE 103 and eNB 101, respectively. UE 103 has an antenna 135, which transmits and receives radio signals. An RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in MTC UE 103. Memory 131 stores program instructions and data 134 to control the operations of UE 103. UE 103 also includes multiple function modules that carry out different tasks in accordance with embodiments of the current invention. A RRC message segmentation circuit 141 receives a radio resource control (RRC) message with a size Z at a layer S of the protocol stack, obtains the size Z and a size limitation L of underlying transmission limit of the protocol stack, and performs an RRC message segmentation based on the size Z and the size limitation L by segmenting the RRC message into a sequence of chunks such that each chunk has a size smaller than L when Z is greater than L. An RRC message reassemble circuit 142 determines the completeness of the RRC message based on at least one procedure selecting from checking corresponding metadata in each chunk of the RRC message, and checking concatenated octets at an RRC layer of the UE. The RRC message segmentation and reassembly are also performed on the network side, such as in an eNB/gNB. In a UL communication, the UE performs the RRC segmentation and the gNB performs the assembly upon receiving it. Similarly, for DL communication, the gNB performs the segmentation and the UE performs the assembly.

Also shown in FIG. 1 is an exemplary block diagram for eNB 101. eNB 101 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 101. Memory 151 stores program instructions and data 154 to control the operations of eNB 101. eNB 101 also includes function modules that carry out different tasks in accordance with embodiments of the current invention. An RRC message segmentation circuit 156 communicates with the UE and performs RRC message segmentation functions. An RRC message resemble circuit 157 communicates with the UE and performs RRC message assembly functions.

In one novel aspect, RRC message segmentation and reassembly are performed by the UE in corresponding protocol stack layers. There are multiple choices and different combination of protocol layers for segmentation and reassembly.

Figure 2:
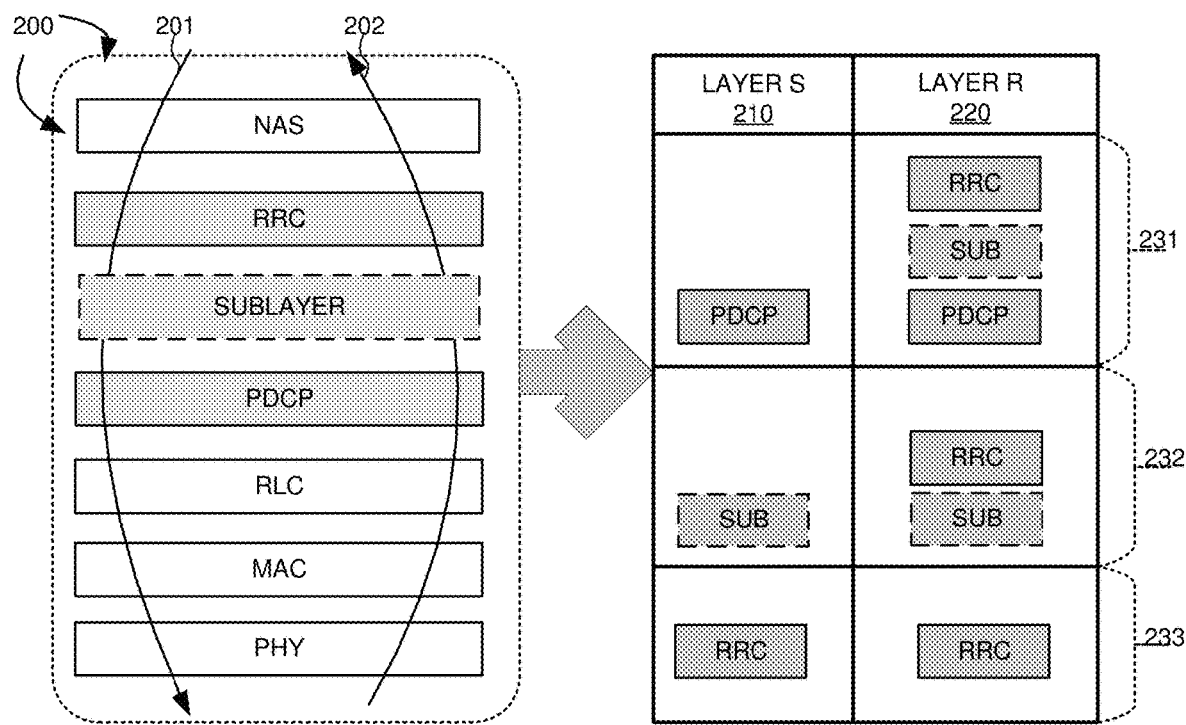
FIG. 2 illustrates exemplary diagrams for different protocol stack layers to perform the RRC message segmentation and reassembly in accordance with embodiments of the current invention.

FIG. 2 illustrates exemplary diagrams for different protocol stack layers to perform the RRC message segmentation and reassembly in accordance with embodiments of the current invention. FIG. 2 shows an exemplary UE protocol stack 200, which includes the PHY layer, the MAC layer, the RLC layer, the PDCP layer, the RRC layer and the NAS layer. For an uplink RRC message 201, the RRC message is sent to the network from the RRC layer to the PDCP, RLC, and PHY. For a downlink RRC 202, the RRC message is received from the PHY to MAC, RLC, PDCP and the RRC layer. When sending out an RRC message, the UE would obtain the size Z of the RRC message. The UE also obtains an underlying size limit L. When the RRC message size Z is greater than the underlying size limit L, a segmentation of the RRC message are needed and is performed at a layer S of the UE protocol stack. In one embodiment, the RRC message segmentation is performed at the RRC layer such that the PDCP layer receives the segmented RRC message chunks, each with a size smaller than the underlying size limit L. In another embodiment, the RRC message segmentation is performed at the PDCP layer. In yet another embodiment, the RRC message segmentation can be performed at a sublayer between the RRC layer and the PDCP layer. Correspondingly, when the segmentation is performed at layer S of a UE protocol stack, the reassembly is performed at a layer R, which is the same as layer S or higher than layer S. Figure illustrates possible choices of layer R 220, choices 231, 232, and 233, based on the layer S 210. As shown, if the RRC segmentation is performed at layer S of PDCP, the RRC reassembly needs to be performed at layer R, with the choices of the PDCP layer, the sublayer, and the RRC layer. Similarly, if the RRC segmentation is performed at layer S of the sublayer, the RRC reassembly needs to be performed at layer R, with the choices of the sublayer, and the RRC layer. If the RRC segmentation is performed at the RRC layer, the RRC message can only be assembled at the RRC layer.

Figure 3:
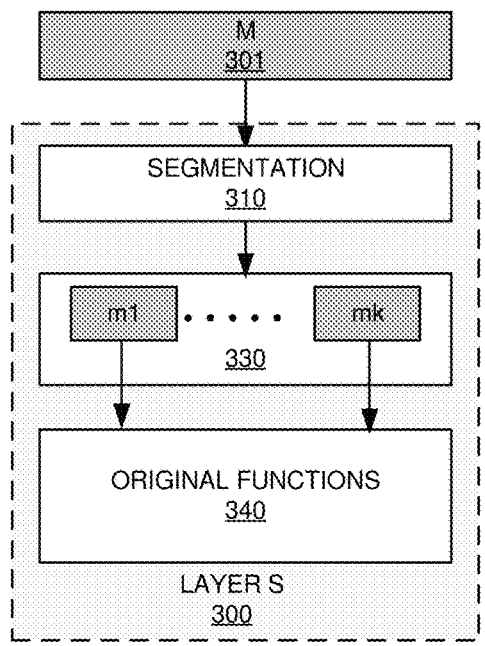
FIG. 3 illustrated an exemplary diagram of the RRC message segmentation performed at the layer S in accordance with embodiments of the current invention.

FIG. 3 illustrated an exemplary diagram of the RRC message segmentation performed at the layer S in accordance with embodiments of the current invention. Layer S 300 receives an RRC message M 301. Layer S 300 at step 301 segments it into chunks $\{m_i\}$ such that the size of each chunk is less than the size limitation L of the underlying transmission. The sequence of chunks of the RRC message 330 includes a plurality of RRC chunks $\{m_1\}$ to $\{m_k\}$. Each RRC chunk $\{m_i\}$ has a size smaller than or equals to the size limit L. In one embodiment, each RRC chunk $\{m_i\}$ has the same size of L except for the last one. In one embodiment, each RRC chunk $\{m_i\}$ may contain a metadata for reassembly. Upon segmenting the RRC message M into a plurality of RRC chunks, layer S treats each RRC chunk $\{m_i\}$ as a sequence of data and sends each RRC chunk $\{m_i\}$ in order the lower layers as usual through the original function module 340.

Figure 4:
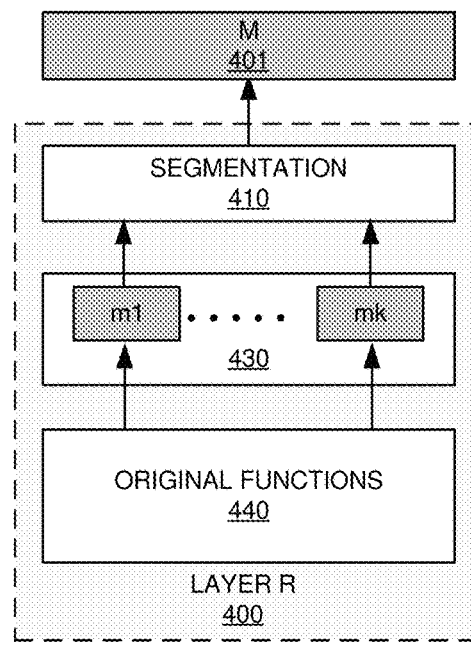
FIG. 4 illustrated an exemplary diagram of the RRC message reassembly performed at the layer R in accordance with embodiments of the current invention.

FIG. 4 illustrated an exemplary diagram of the RRC message reassembly performed at the layer R in accordance with embodiments of the current invention. Layer R 400 receives a sequence of chunks $\{m_i\}$ of an RRC message M in order through its original function 440. Layer R 400 whenever receiving a chuck $m_i$ of an RRC message, layer R 400 concatenates the received chunks and checks if the result is a complete/reassembled RRC message. In one embodiment, layer R 400 checks the completeness of the RRC message based on metadata for reassembly in each chunk. In another embodiment, when the reassembly is performed at the RRC layer, layer R, being the RRC layer, checks the completeness of concatenated octets. After reassembly at step 410, layer R 400 passes the RRC message M 401 to the upper layer.

In some embodiments, the PDCP layer can be the layer S and/or the layer R, which performs the RRC segmentation and reassembly, respectively. In one embodiment, a reserved bit in the PDCP message header is used to indicate the status of the RRC message segmentation.

Figure 5A:
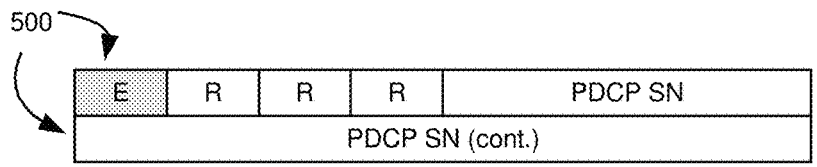
FIG. 5A illustrates a PDCP header where one reserved bit for SRB is used to indicate the need to reassemble the RRC message in accordance with embodiments of the current invention.

FIG. 5A illustrates a PDCP header where one reserved bit for SRB is used to indicate the need to reassemble the RRC message in accordance with embodiments of the current invention. Diagram 500 is an exemplary PDCP header, which includes 4 reserved bits and the PDCP sequence number. In one embodiment, one reserve bit of the PDCP header for signaling radio bearer (SRB) is used to indicate the need of reassembly. As shown, bit E is set to indicate whether the PDCP PDU is the end of the message from the upper layers. Similarly, when performing the RRC message segmentation at the PDCP layer, the reserved bit E is set to indicate whether the PDCP PDU is the last chunk of the RRC message segmentation.

Figure 5B:
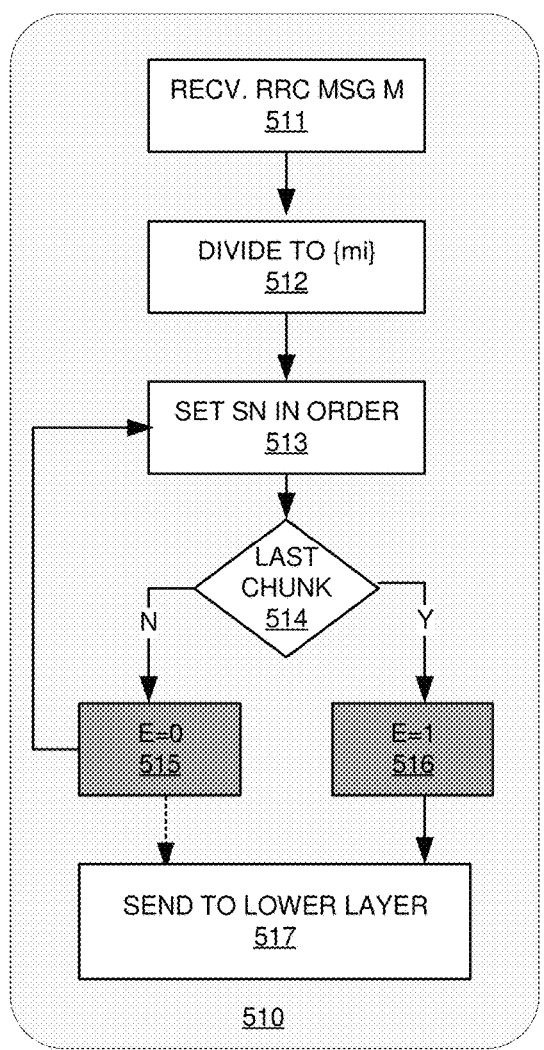
FIG. 5B illustrates an exemplary diagram for the RRC message segmentation performed at the PDCP layer in accordance with embodiments of the current invention.

FIG. 5B illustrates an exemplary diagram for the RRC message segmentation performed at the PDCP layer in accordance with embodiments of the current invention. In one embodiment, the RRC message segmentation can be performed at the PDCP layer. The PDCP layer obtains the size limit L first. At step 511, the PDCP layer receives RRC message M from the RRC layer. At step 512, the PDCP layer divides the RRC message M into a sequence of chunks $\{m_i\}$. The size of each chunk is at most L. In one embodiment, the PDCP layer fills up each RRC chunk $\{m_i\}$ with the size L until the last chunk, which may be smaller than the size L. At step 513, the PDCP layer adds PDCP header in order. At step 514, the PDCP layer checks whether the RRC chunk $\{m_i\}$ is the last RRC chunk. If step 514 determines no, the PDCP layer, at step 515, sets the reserved bit E to zero (E=0) and continues with the next RRC chunk to step 513. In one embodiment, the PDCP layer sends the RRC chunk with the sequence number the reserved bit to the lower layer at step 517. If step 514 determines yes, the PDCP layer, at step 516, sets the reserved bit E to one (E=1). The PDCP layer sends the RRC chunk with the sequence number the reserved bit to the lower layer at step 517.

Figure 5C:
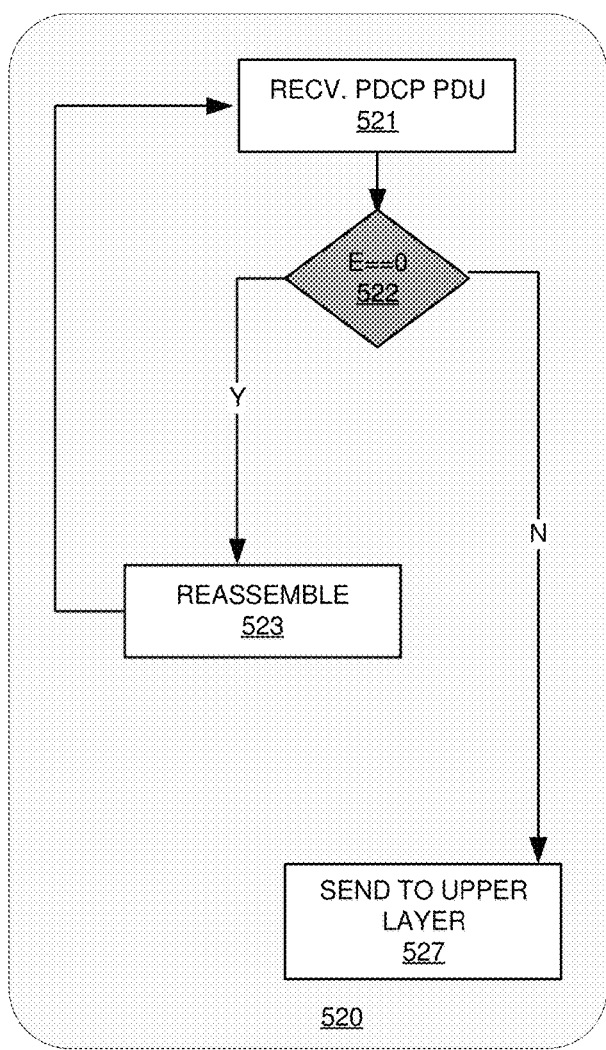
FIG. 5C illustrates an exemplary diagram for the RRC message reassembly performed at the PDCP layer in accordance with embodiments of the current invention.

FIG. 5C illustrates an exemplary diagram for the RRC message reassembly performed at the PDCP layer in accordance with embodiments of the current invention. In one embodiment, the RRC message reassembly can be performed at the PDCP layer. At step 521, the PDCP layer receives a PDCP PDU in SRB. At step 522, the PDCP layer checks whether the reserved bit E in the PDU header for SRB is zero (E==0). If step 522 determines yes, the PDCP layer, at step 523, reassembles its data with the next PDCP PDU. If step 522 determines no (E==1), the PDCP layer, at step 527, delivers the reassembled content to the upper layer.

In other embodiments, the RRC message segmentation and/or reassembly can be performed at the RRC layer. When the RRC message segmentation is performed at the RRC layer, the RRC layer obtains the RRC message size limit L first. The RRC layer, before sending the RRC message M to the lower layer, divides the RRC message M into the sequence of chunks $\{m_i\}$. The size of each of the RRC chunk $\{m_i\}$ is smaller than or equals to the size limit L. In one embodiment, each of the RRC chunk $\{m_i\}$ has a size of L except for the last one, which may have a size of less than the size limit L. The RRC layer can also perform the RRC message reassembly. The RRC layer also performs error checking function for the RRC reassembly.

Figure 6:
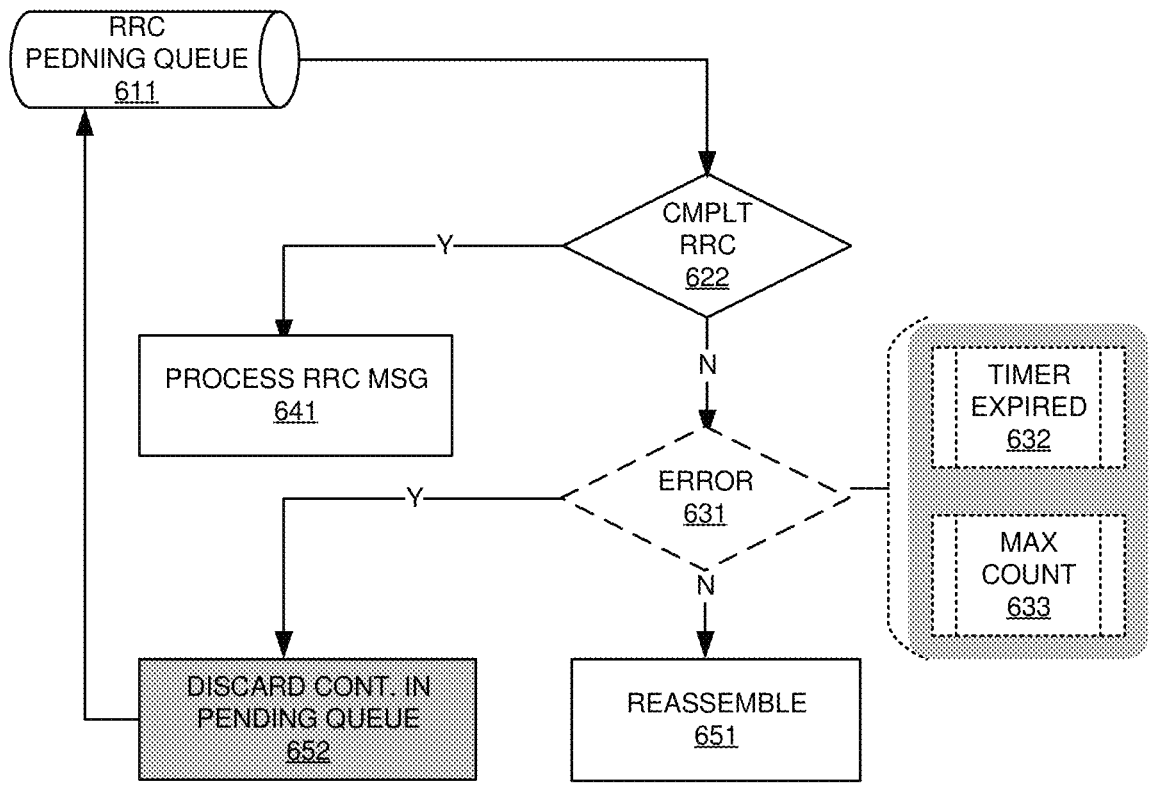
FIG. 6 illustrates exemplary diagrams of the RRC message assembly at the RRC layer in accordance with embodiments of the current invention.

FIG. 6 illustrates exemplary diagrams of the RRC message assembly at the RRC layer in accordance with embodiments of the current invention. In one embodiment, the RRC layer decodes the RRC message with ASN.1 decoder. The ASN.1 decoder performs the check of the completeness of the RRC message. The RRC layer also stores the incoming message in a pending queue 611 to store the incomplete RRC message. When receiving an RRC message chunk from the lower layer, the RRC layer, via the ASN.1 decoder, at step 622 checks if this chunk is a complete RRC message. If step 622 determines it is a complete RRC message itself, the RRC layer, at step 641, processes the complete RRC message and discards the contents in the pending queue 611. If step 622 determines no, the RRC layer, at step 651, would concatenate this chunk with the pending queue 611. If the pending queue is not empty and the content is a complete RRC message, process it and discard the content in pending queue 611. In other embodiments, error handling 631 is performed. In one embodiment, a timer is used to check the corrupted RRC message. A procedure 631 is performed for the RRC layer reassembly of the RRC message. If the content in the pending queue is not a complete RRC message, a timer is started. Upon the timer expiration and the complete RRC message is not decoded, the RRC layer discards corrupted RRC chunks. In one embodiment, if the RRC layer cannot recover the corrupted RRC message in the pending queue, the RRC layer can still process the segmented RRC message after the corrupted one. In another embodiment, an RRC chunk counter procedure 632 is used to limit the size of the pending queue. An upper bound limit for the pending queue can be useful for RRC layer implementation although it limits the RRC message size. Upon detecting the pending queue size reaches the upper bound limit, the RRC chunks are discarded. The RRC layer may use the timer error handling alone, or use the upper bound limit error handling alone or can combine both error handling procedures together.

In another embodiment, when the RRC layer receives a chunk of RRC message, it determines whether it is the first chunk of the RRC message. If it is the first chunk of the RRC message, the RRC layer performs ASN.1 decoding and processes complete IEs, and keeps incomplete IEs. The RRC layer records ASN.1 decoding status for further incoming RRC message chunks. If the RRC chunk is no the first chunk of the RRC message, the RRC layer continues the ASN.1 decoding. If the whole RRC message is delivered, the RRC layer resets the ASN.1 decoder status so that the RRC layer will treat the next chunk as the first one.

In one novel aspect, the UE determines the RRC message size limit L to perform the RRC message segmentation. It's unknown to a UE whether some size limitation exists on the interface between the base station and the core network. There are known PDCP layer size limits in the LTE network and the NR network. These are the known size limits. There are also size limitations in the base station, in the core network or between the base station and the core network or other paths, which is currently unknown to the UE. Some size limitations vary with different implementations and are not specified. These are unknown size limits. If unknown size limit is smaller than known size limit and UE triggers an RRC message with size greater than the unknown size limit, the transmission would fail and UE cannot figure it out. Without network assistance, UE can only retransmit the same message, which would fail again. In one embodiment, the UE can autonomously reduce the message size by trial and error but this solution is suboptimal due to indefinite latency and overhead. In another embodiment, the UE obtains the size limit before sending the RRC message.

Figure 7:
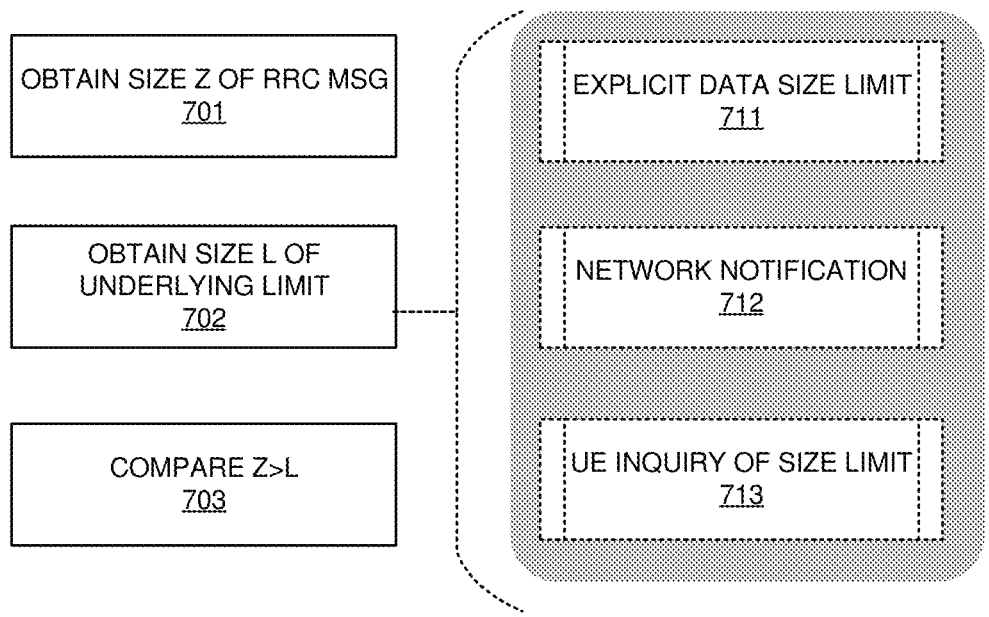
FIG. 7 illustrates exemplary diagrams for the UE to determine the message size limit L and to obtain the size of the RRC message in determining the RRC message segmentation in accordance with embodiments of the current invention.

FIG. 7 illustrates exemplary diagrams for the UE to determine the message size limit L and to obtain the size of the RRC message in determining the RRC message segmentation in accordance with embodiments of the current invention. At step 701, the layer S of the UE protocol stack, obtains the size Z of the RRC message. At step 702, layer S obtains the size limit L of the underlying size limit, including the UE side and the network side. In other embodiment, layer R upon reassembling the RRC message, also obtains the size limit L. At step 703, the layer S compares the size Z with the size L and triggers RRC message segmentation upon detecting the size Z is greater than the size L. In one embodiment, in step 711, the size limit L is obtained explicitly as predefined data size limit. In another embodiment, as in step 712, the size limit L is obtained through network notification. In yet another embodiment, as in step 713, the size limit L is obtained through UE inquiry of the size limit.

Figure 8A:
FIG. 8A illustrates an exemplary message flow diagram of the explicit data size limit obtained for the RRC message in accordance with embodiments of the current invention.

FIG. 8A illustrates an exemplary message flow diagram of the explicit data size limit obtained for the RRC message in accordance with embodiments of the current invention. In one embodiment, the explicit data size limitations for RRC message is defined in standards so UE implementation can follow. In this scenario, no signaling is needed and the size limit L is predefined. In another embodiment, the size limit L is obtained by the network notification. UE 801 connects with the network via a base station 802. At step 811, the network actively notifies UE the size limitation to avoid UE oversized RRC messages. In one embodiment, the information can be carried through broadcast, such as the system information.

Figure 8B:
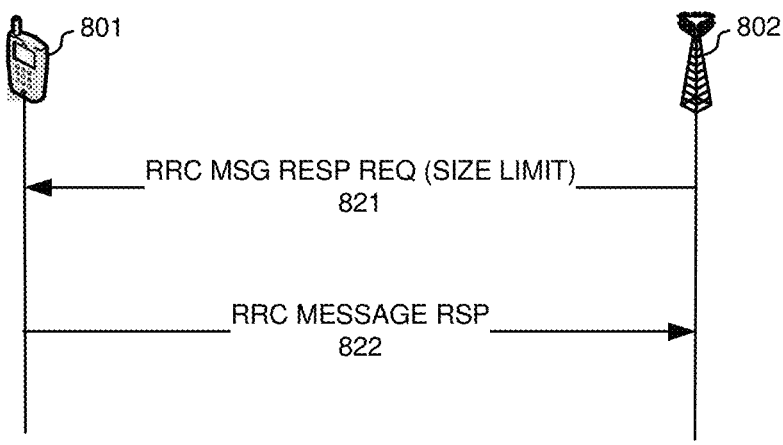
FIG. 8B illustrates an exemplary message flow diagram of using the network notification to obtain the size limit L for the RRC message in accordance with embodiments of the current invention.

FIG. 8B illustrates an exemplary message flow diagram of using the network notification to obtain the size limit L for the RRC message in accordance with embodiments of the current invention. UE 801 connects with the network via a base station 802. At step 821, the network actively notifies UE the size limitation to avoid UE oversized RRC messages. In one embodiment, the information can be carried through DL RRC message that triggered UL RRC message response. At step 822, the UE sends the RRC message in response.

Figure 8C:
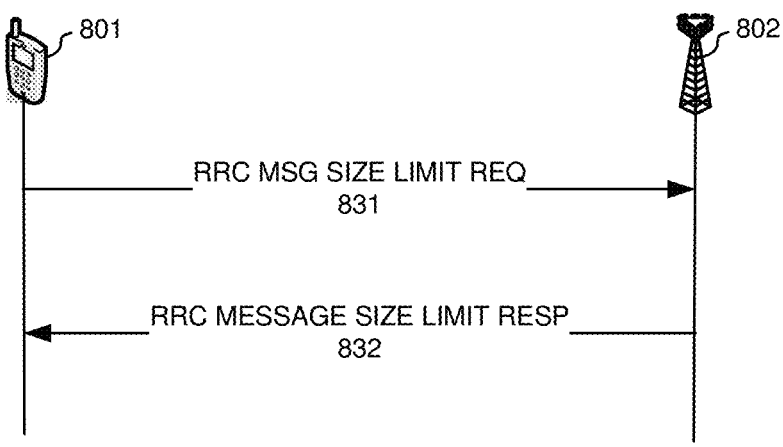
FIG. 8C illustrates an exemplary message flow diagram of using the UE inquiry to obtain the size limit L for the RRC message in accordance with embodiments of the current invention.

FIG. 8C illustrates an exemplary message flow diagram of using the UE inquiry to obtain the size limit L for the RRC message in accordance with embodiments of the current invention. In one embodiment, the UE queries the size limitation before sending a large RRC message. UE 801 connects with the network via a base station 802. At step 831, the UE sends RRC Message with Size Limit Request to the network. At step 832, the network response with an RRC message of size limit response.

Figure 9:
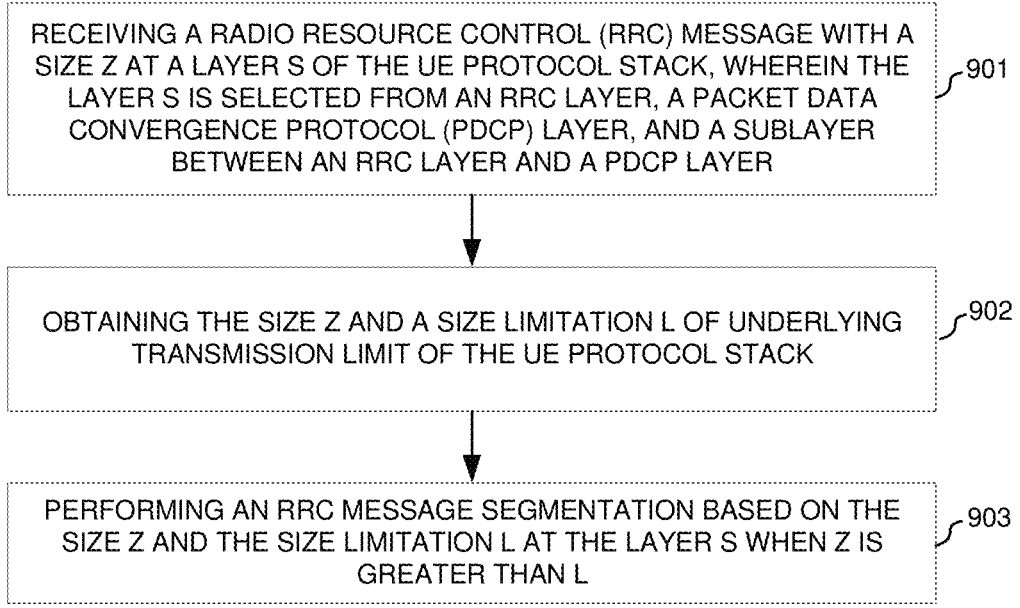
FIG. 9 illustrates an exemplary flow chart for an RRC message segmentation in accordance with embodiments of the current invention.

FIG. 9 illustrates an exemplary flow chart for an RRC message segmentation in accordance with embodiments of the current invention. At step 901, the UE receives a radio resource control (RRC) message with a size Z at a layer S of the UE protocol stack, wherein the layer S is selected from an RRC layer, a packet data convergence protocol (PDCP) layer, and a sublayer between an RRC layer and a PDCP layer. At step 902, the UE obtains the size Z and a size limitation L of underlying transmission limit of the UE protocol stack. At step 903, the UE performs an RRC message segmentation based on the size Z and the size limitation L at the layer S when Z is greater than L.

Figure 10:
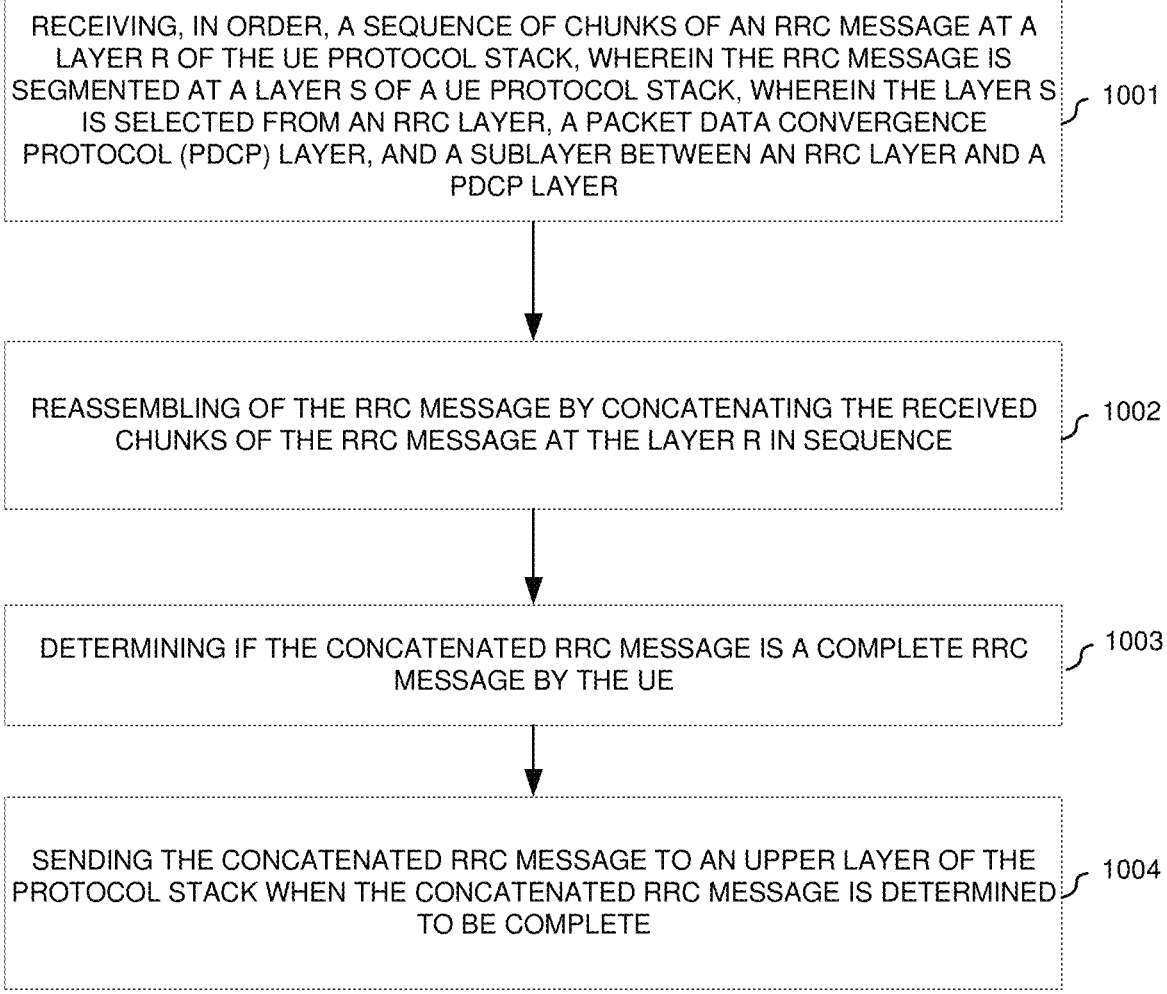
FIG. 10 illustrates an exemplary flow chart for an RRC message reassembly in accordance with embodiments of the current invention.

FIG. 10 illustrates an exemplary flow chart for an RRC message reassembly in accordance with embodiments of the current invention. At step 1001, the UE receives, in order, a sequence of chunks of an RRC message at a layer R of the UE protocol stack, wherein the RRC message is segmented at a layer S of a UE protocol stack, wherein the layer S is selected from an RRC layer, a packet data convergence protocol (PDCP) layer, and a sublayer between an RRC layer and a PDCP layer. At step 1002, the UE reassembles of the RRC message by concatenating the received chunks of the RRC message at the layer R in sequence. At step 1003, the UE determines if the concatenated RRC message is a complete RRC message by the UE. At step 1004, the UE sends the concatenated RRC message to an upper layer of the protocol stack when the concatenated RRC message is determined to be complete.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a user equipment (UE) with a UE protocol stack in a wireless network, comprising:
   receiving a radio resource control (RRC) message with a size Z at a layer S of the UE protocol stack, wherein the layer S is selected from an RRC layer, a packet data convergence protocol (PDCP) layer, and a sublayer between the RRC layer and the PDCP layer;
   obtaining the size Z and a size limitation L of an underlying transmission limit of the UE protocol stack; and
   performing an RRC message segmentation based on the size Z and the size limitation L at the layer S when Z is greater than L.

2. The method of claim 1, wherein the layer S segments the RRC message into a sequence of chunks such that each chunk has a size no more than L.

3. The method of claim 2, wherein each chunk of the RRC message includes a metadata for reassembly.

4. The method of claim 2, wherein the layer S sends each chunk of the RRC message in a sequence order to lower layers of the UE protocol stack.

5. The method of claim 2, wherein a reserved bit in a PDCP message header is used to indicate a reassembly is needed when the RRC message is segmented at the layer S.

6. The method of claim 1, wherein the size limitation L is obtained with a procedure selecting from obtaining a network predefined value of L, receiving a network notification of the size limitation L, and receiving a reply to an enquiry of the size limitation L by the UE.

7. A user equipment (UE), comprising:
   a radio frequency (RF) transceiver that transmits and receives radio signals in a wireless network;
   a protocol stack that processes signal and data of the UE for transmission and reception; and
   an RRC message segmentation circuit that receives a radio resource control (RRC) message with a size Z at a layer S of the protocol stack, obtains the size Z and a size limitation L of an underlying transmission limit of the protocol stack, and performs an RRC message segmentation based on the size Z and the size limitation L by segmenting the RRC message into a sequence of chunks such that each chunk has a size smaller than L when Z is greater than L, wherein the layer S is selected from an RRC layer, a packet data convergence protocol (PDCP) layer, and a sublayer between the RRC layer and the PDCP layer.

8. The UE of claim 7, wherein each chunk of the RRC message includes a metadata for reassembly.

9. The UE of claim 7, wherein a reserved bit in a PDCP message header is used to indicate a reassembly is needed when the RRC message is segmented.

10. The UE of claim 7, wherein the size limitation L is obtained with a procedure selecting from obtaining a network predefined value of L, receiving a network notification of the size limitation L, and receiving a reply to an enquiry of the size limitation L by the UE.

11. The UE of claim 7, wherein the RRC message segmentation circuit further performs RRC message reassembly at a protocol stack layer selected from a same layer as the layer S and a layer higher than the layer S.

12. The UE of claim 11, wherein the UE determines the completeness of the RRC message based on at least one procedure selecting from checking corresponding metadata in each chunk of the RRC message, and checking concatenated octets at an RRC layer of the UE.

13. The UE of claim 11, wherein the reassembling is performed at a PDCP layer of the UE protocol stack on a PDCP packet data unit (PDU), and wherein the PDCP layer reassembles received data with a next PDCP PDU if a reserved bit of the PDCP PDU header equals 0, otherwise, the PDCP layer delivers reassembled data to an upper layer.

14. The UE of claim 11, wherein the reassembling is performed at an RRC layer of the UE protocol stack by storing and concatenating chunks of the RRC message in a pending queue, and wherein the RRC layer processes and discards remainder contents of the pending queue if the concatenated chunks of the RRC message is a complete RRC message.

* * * * *